US009009465B2

(12) United States Patent
Zhang et al.

(10) Patent No.: US 9,009,465 B2
(45) Date of Patent: Apr. 14, 2015

(54) AUGMENTING NAME/PREFIX BASED ROUTING PROTOCOLS WITH TRUST ANCHOR IN INFORMATION-CENTRIC NETWORKS (71) Applicant: Futurewei Technologies, Inc., Plano, TX (US)

(72) Inventors: Xinwen Zhang, San Ramon, CA (US); Haiyong Xie, Union City, CA (US); Ravishankar Ravindran, San Ramon, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1 day.

(21) Appl. No.: 13/970,713

(22) Filed: Aug. 20, 2013

(65) Prior Publication Data
US 2014/0281505 A1   Sep. 18, 2014

Related U.S. Application Data (60) Provisional application No. 61/780,805, filed on Mar. 13, 2013.

(51) Int. Cl.
*H04L 29/06* (2006.01)
*H04L 9/32* (2006.01)
*G06F 15/16* (2006.01)
*G06F 11/00* (2006.01)

(52) U.S. Cl.
CPC .............. *H04L 9/3268* (2013.01); *H04L 63/00* (2013.01)

(58) Field of Classification Search
CPC .............................. H04L 9/3268; H04L 63/00
See application file for complete search history.

(56) References Cited

U.S. PATENT DOCUMENTS

| 7,761,465 | B1 * | 7/2010 | Nonaka et al. | 707/770 |
| 8,601,566 | B2 * | 12/2013 | Adusumilli | 726/12 |
| 2006/0028996 | A1 * | 2/2006 | Huegen et al. | 370/252 |
| 2009/0285209 | A1 * | 11/2009 | Stewart et al. | 370/389 |
| 2009/0287934 | A1 | 11/2009 | Yamamoto et al. | |
| 2009/0288163 | A1 * | 11/2009 | Jacobson et al. | 726/22 |

(Continued)

FOREIGN PATENT DOCUMENTS

| CN | 101145915 A | 3/2008 |
| EP | 2259542 A1 | 8/2010 |

OTHER PUBLICATIONS

Partial English Translation and Abstract of Chinese Patent Application No. CN101145915A, Aug. 27, 2014, 10 pages.

(Continued)

*Primary Examiner* — Dede Zecher
*Assistant Examiner* — Trang Doan
(74) *Attorney, Agent, or Firm* — Conley Rose, P.C.; Grant Rodolph; Brandt D. Howell (57) ABSTRACT An apparatus comprising a memory, a processor coupled to the memory, wherein the memory contains instructions that when executed by the processor cause the apparatus to receive an information centric network (ICN) name prefix announcement message comprising a message prefix specific to a publisher, a public key certificate specific to the content publisher, and a signature specific to the content publisher, verify the signature with a name registration service (NRS), and update internal data indicating that the content publisher is a trusted publisher, wherein the internal data comprises the prefix, the public key, and the signature.

20 Claims, 6 Drawing Sheets

(56) References Cited

U.S. PATENT DOCUMENTS

2011/0264908 A1* 10/2011 Feng et al. .................... 713/153
2012/0204224 A1* 8/2012 Wang et al. ...................... 726/3
2012/0260329 A1 10/2012 Suffling

OTHER PUBLICATIONS

Murphy, S., et al., "OSPF with Digital Signatures," RFC 2154, Jun. 1997, 29 pages.

Moy, J., et al., "OSPF Version 2," RFC 2328, Apr. 1998, 201 pages.

Foreign Communication From A Counterpart Application, PCT Application No. PCT/CN2014/073339, International Search Report dated Jun. 16, 2014, 7 pages.

Foreign Communication From A Counterpart Application, PCT Application No. PCT/CN2014/073339, Written Opinion dated Jun. 16, 2014, 5 pages.

* cited by examiner

FIG. 8 ed in request packets. Without built-in trust verification mechanisms, malicious clients, e.g., botnets, can inject faked prefixes into the network. These malicious acts may consume expensive network resources and degrade or even prevent the access of benign users, e.g., in a denial of service (DoS) or distributed DoS (DDoS) attack directed to one or more components in the network infrastructure, e.g., a router. Other malicious clients may publish content names and/or prefixes of benign publishers of electronic content, preventing users from receiving valid data, e.g., in a DoS attack directed to content providers/owners. Proposed solutions, e.g., rate control with faces and/or prefixes, have proven largely ineffective due to the adaptive behavior of malicious clients, e.g., fictitious names and/or faces, and the potential degradation in the user's quality of experience (QoE) due to increased processing demands.

AUGMENTING NAME/PREFIX BASED ROUTING PROTOCOLS WITH TRUST ANCHOR IN INFORMATION-CENTRIC NETWORKS

CROSS-REFERENCE TO RELATED APPLICATIONS

The present application claims priority to U.S. Provisional Patent Application No. 61/780,805, filed Mar. 13, 2013 by Xinwen Zhang, et al., titled "Method For Augmenting Name/Prefix Based Routing Protocols With Trust Anchor In Information-Centric Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks comprise network nodes, such as routers, switches, bridges, and other devices that transport data through the network. Over the years, the telecommunication industry has made significant improvements to the network nodes to support an increasing number of protocols and specifications standardized by the Internet Engineering Task Force (IETF). Creating and coupling the complex network nodes to form networks that support and implement the various IETF standards (e.g., virtual private network requirements) has cause modern networks to become complex and difficult to manage. As a result, vendors and third-party operators seek to customize, optimize, and improve the performance of the interwoven web of network nodes.

An Information Centric Network (ICN) is a type of network architecture in which the focus is on locating and providing information to users rather than on connecting end hosts that exchange data. One type of ICN is a Content-Oriented Network (CON). In a CON, also referred to as a Content Centric Network (CCN), a content router is responsible for routing user requests and content to proper recipients. The entities may comprise data content, such as video clips or web pages, and/or infrastructure elements, such as routers, switches, or servers.

ICNs go beyond the existing Internet Protocol (IP) networks by shifting the communication model from the current host-to-host model, e.g., the Internet model, to the information-object-to-object model, e.g., the ICN model. In ICN, information objects become the first class abstraction for the entities that exist in the communication model. Information objects are assigned names, and routing to and from such named objects is based on those names. In ICN, an IP address may be treated as a special type of name. Users who want to retrieve the information objects do not need to know where they are located, as distinct from current IP networks where users must specify the destination host's IP address when sending out such requests.

Consequently, ICNs and other content-based Internet architectures use content names or prefixes as routing labels, such that routers route data requests to next hop nodes based on content names, prefixes, or identifications (IDs), embed-

SUMMARY

In one embodiment, the disclosure includes an apparatus comprising a memory, a processor coupled to the memory, wherein the memory contains instructions that when executed by the processor cause the apparatus to receive an ICN name prefix announcement message comprising a message prefix specific to a content publisher node coupled to or comprised within the ICN, a public key encryption certificate specific to the content publisher, and a digital signature specific to the content publisher, verify the signature with a name registration service (NRS), and update internal data indicating that the content publisher is a trusted publisher, wherein the internal data comprises the prefix, the public key, and the signature.

In another embodiment, the disclosure includes a computer program product comprising computer executable instructions stored on a non-transitory medium that when executed by a processor cause the processor to receive, via a first face, an ICN name prefix announcement message comprising a prefix and a digital signature, query a data table for a table entry corresponding to the first face, the prefix, and the signature, forward the prefix announcement via a second face when the table entry exists in the table, and when the table entry does not exist in the table, send a signature verification request to a NRS, wherein the request comprises the signature, drop the data when a verification failure indication is received from the NRS in response to the request, and, when a verification confirmation indication is received from the NRS in response to the request, create the table entry corresponding to the first face, the prefix, and the signature, and forward the prefix announcement message via the second face.

In yet another embodiment, the disclosure includes a method of executing a name prefix based routing protocol, comprising receiving a first information centric network (ICN) name prefix announcement message comprising a prefix, a signature, and a public key certificate, querying a routing table for an entry corresponding to the prefix announcement message, wherein the routing table comprises prefix, signature, and public key encryption certificate fields for each entry fields, forwarding the data request upon receiving confirmation that the entry exists in the routing table, and, upon receiving confirmation that the entry does not exist in the routing table, sending a signature verification request to a NRS, dropping the first prefix announcement message upon receipt of a verification failure indication from the NRS, and, upon receiving verification confirmation from the NRS, creating the routing table entry corresponding to the prefix, the signature, and the public key, and sending a second prefix announcement message via a second face.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
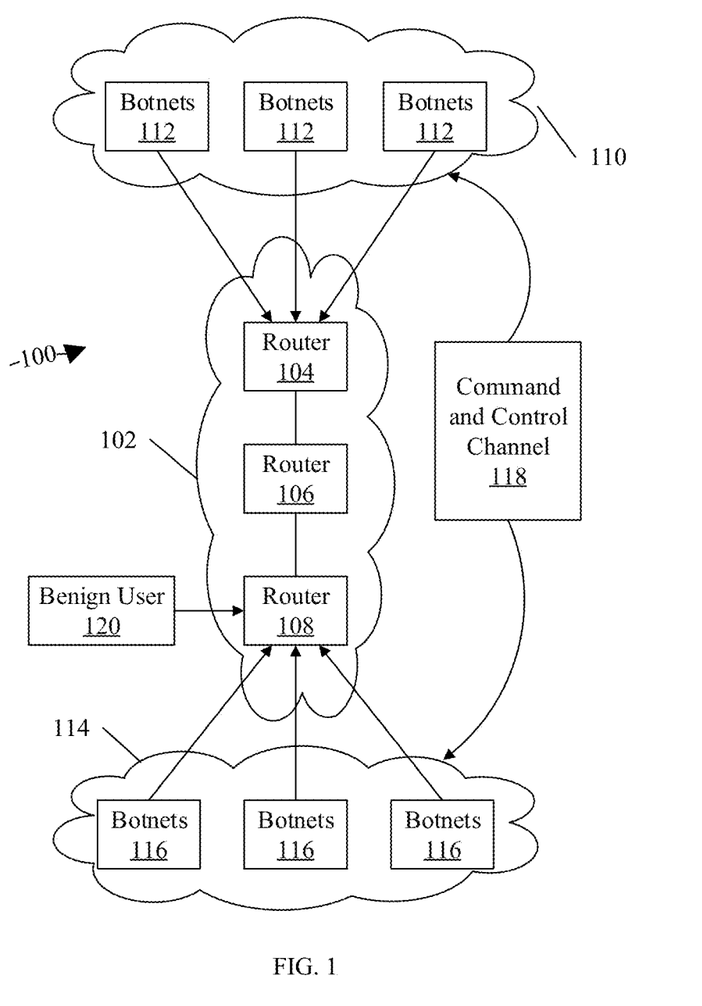
FIG. 1 is a schematic diagram of a system depicting a DoS attack directed to components of an ICN network infrastructure.

FIG. 1 is a schematic diagram of a system 100 depicting a DoS attack directed to components of an ICN network infrastructure 102. The ICN network infrastructure 102 comprises routers 104, 106, and 108. System 100 contains a network 110 of autonomous systems and/or botnets 112. Botnets may be defined as collections of internet-connected programs communicating with other similar programs in order to perform tasks, e.g., operating under a single external routing policy. System 100 further contains a network 114 of botnets 116. The networks 110 and 114 may be in communication with the ICN network infrastructure 102. The botnets 112 and 116 may be controlled by a command and control channel 118. The command and control channel 118 may coordinate botnet attacks, e.g., DDoS attacks, directed to the ICN network infrastructure 102.

For example, the command and control channel 118 may direct the botnets 116 of network 114 to attack router 108. The command and control channel 118 may obtain one or more prefixes utilized by ICN network infrastructure 102, e.g., using the available routing mechanisms and the announcements accepted by routers 104, 106, and/or 108. The command and control channel 118 may send these prefixes to the botnets 116 and 112. Botnets 112 may publish names having the same prefix but different names, e.g., /aname/nounce, and botnets 116 may send interest to the names published by the botnets 112. Because routers of ICN network infrastructure 102 may forward the interests, maintain in-network state information, forward data back, and store content cache, the Pending Interest Table (PIT) and/or Content Store (CS) of access routers may be flooded with large numbers of interests. Consequently, when a benign user 120 sends a legitimate interest to router 108, the legitimate interest may be delayed due to the large number of pending DoS interests in the access router 108 or dropped due to rate control protection mechanisms in the router 108 interface. Either outcome may result in downgraded delivery efficiency since the CS in the access router may be exhausted by DoS data from the botnets 116 and/or 112.

Figure 2:
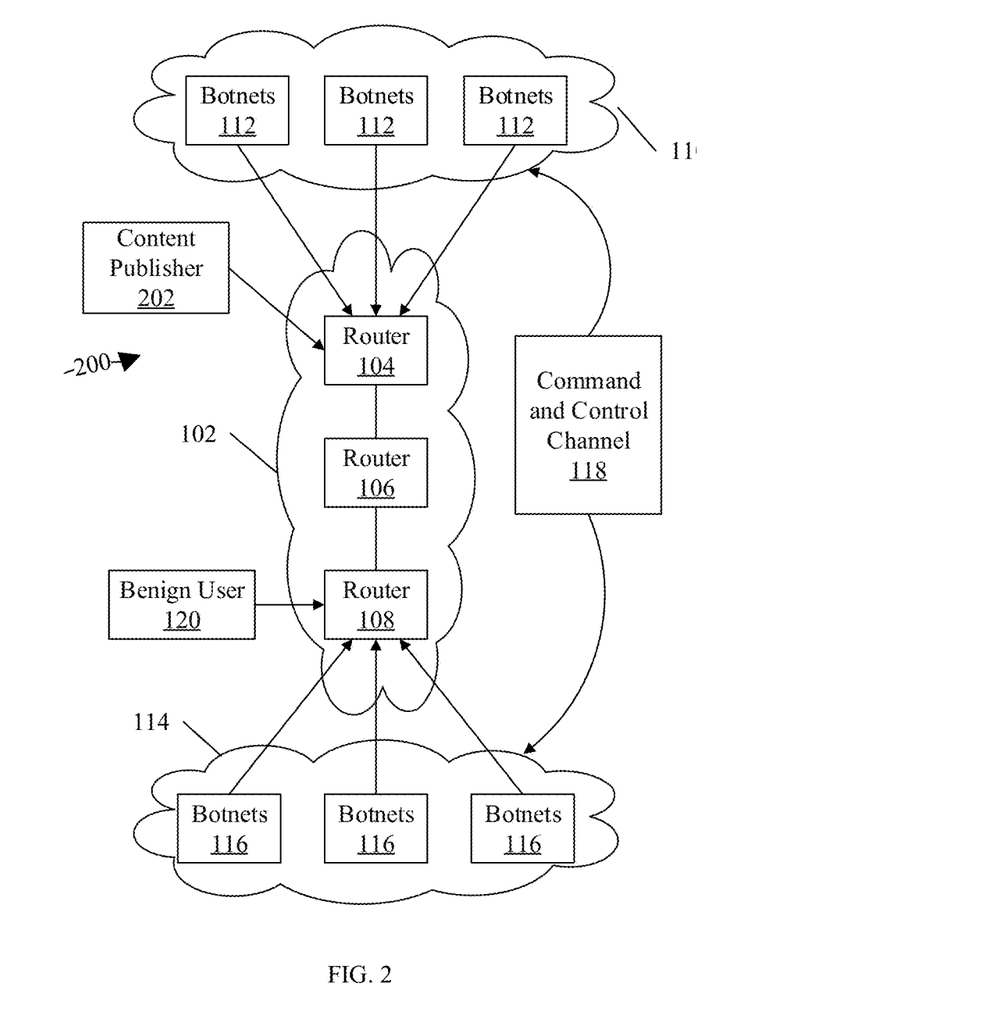
FIG. 2 is a schematic diagram of a system depicting a DDoS attack directed to a content publisher.

FIG. 2 is a schematic diagram of a system 200 depicting a DDoS attack directed to a content publisher 202, e.g., a server, an end-user, etc. The components of FIG. 2 are substantially the same as the corresponding components of FIG. 1. In FIG. 2, the botnets 116 are located within the same domain as the targeted benign user 120 and the botnets 112 are located within the same domain as the content publisher 202. To initiate a DDoS attack directed at the content publisher 202, the botnets 112 may publish a name prefix which is the same as that of a valid origin server. Following standard conventions, ICN network infrastructure 102 may announce and accept the prefixes. The botnets 116 may send interest names to names published by the botnets 112, with a hash of the botnet's master public key, e.g., PublisherPublicKeyDigest. When ICN routers 104, 106, and/or 108 have two ports or faces recorded in their routing tables for the same name prefix, they may send the interest to multiple paths. This may increase network congestion, introduce lag times, and decrease network efficiency. When ICN routers 104, 106, and/or 108 receive protocol data units (PDUs), the PDU from the botnets 112 and/or 116 may be accepted since they have a "valid" PublisherPublicKeyDigest. ICN routers 104, 106, and/or 108 may forward and cache these data PDUs as usual. Consequently, the benign user's 120 interests to the same prefix may be satisfied by cache in the ICN network infrastructure 102 routers 104, 106, and/or 108, which may be different from the authentic content published by the content publisher 202.

Figure 6:
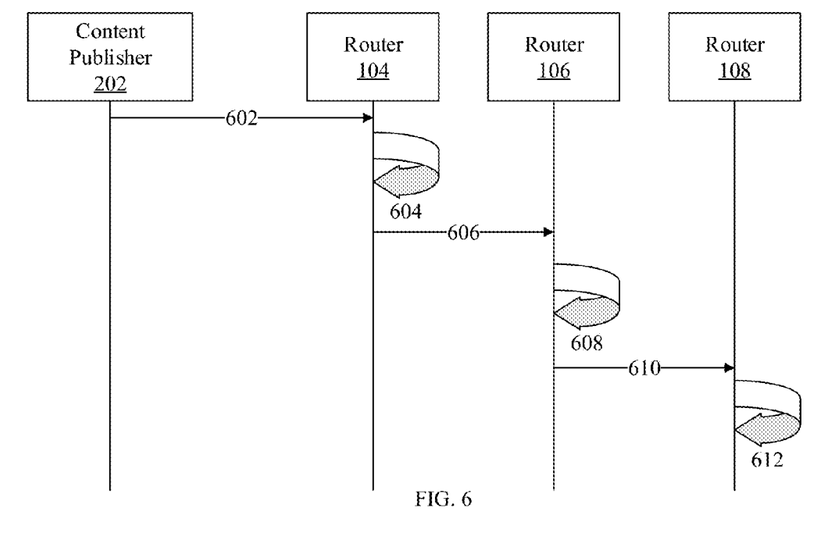
FIG. 6 shows a protocol diagram for a name prefix announcement.
Figure 7:
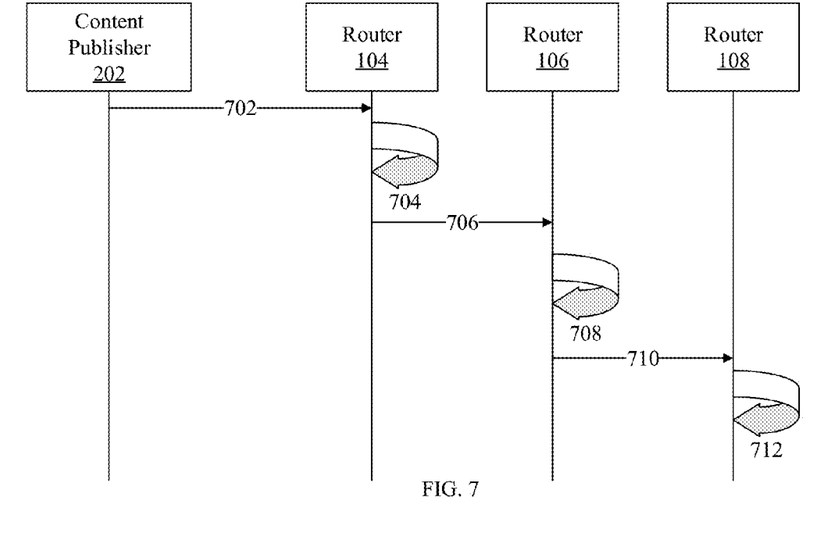
FIG. 7 shows a protocol diagram for a name prefix revocation.

The disclosed systems and methods may be sufficient to avoid the DoS and DDoS attacks specified above. Specifically, the disclosed systems and methods may increase security against DoS and DDoS attacks by inserting trust anchor data (e.g., data confirming validation status via a chain of trust from a configured trust anchor to that data) into name/prefix based routing protocol in ICNs and/or any other Internet architectures where content names or IDs may be used in routing and forwarding. For example, a sender may be indicated as 'trusted' by augmenting a routers' routing tables, e.g., forwarding tables or forwarding information bases (FIBs), with corresponding credentials after successfully verifying a name/prefix routing announcement. The disclosed systems and methods include a key-exchange protocol to establish and verify trusted data and/or components by verifying the authority and authenticity of content names/prefixes and/or associated credentials, e.g., using a NRS and bootstrapping procedure discussed below under FIG. 4 in conjunction with the link-based SSK described in FIG. 5, in order to pass trusted data along known and/or trusted paths. FIGS. 6 and 7 describe how a prefix announcement and revocation protocol using a disclosed embodiment may occur.

Figure 3:
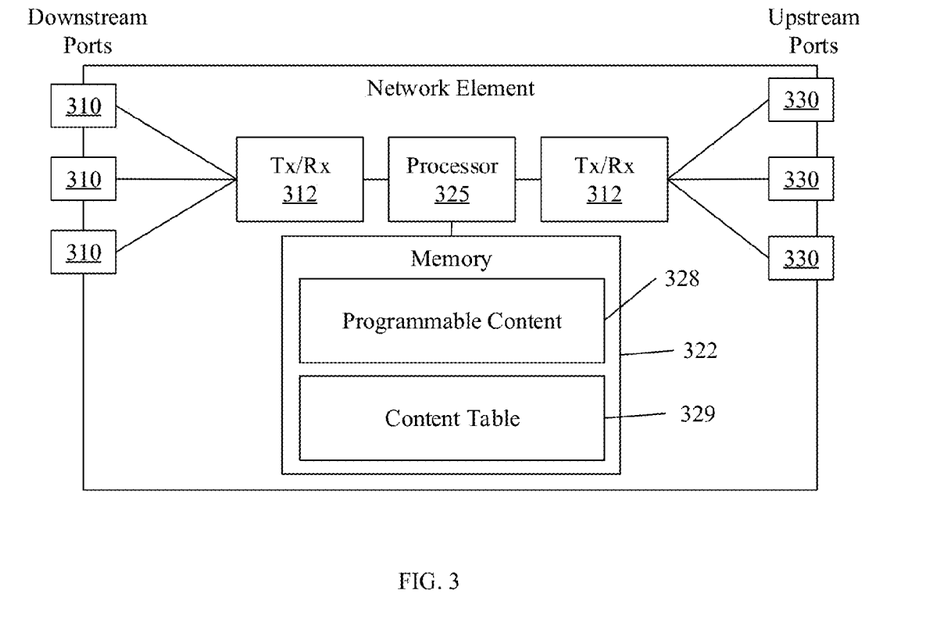
FIG. 3 is a schematic diagram of an embodiment of a network element.

At least some of the features/methods described in the disclosure may be implemented in and/or executed by a network element. For instance, the features/methods of the disclosure may be implemented using hardware, firmware, and/or software installed to run on hardware. The network element may be any device that transports data through a network, e.g., a switch, router, bridge, server, client, etc. FIG. 3 is a schematic diagram of an embodiment of a network element 300, which may be any device that transports and processes data through a network, e.g., ICN network infrastructure 102. For instance, the network element 300 may be a content router or any apparatus or router in the ICN scheme described above, e.g., routers 104, 106, and 108. The network element 300 may be configured to implement or support the adaptive forwarding strategies described above.

The network element 300 may comprise one or more downstream ports 310 coupled to a transceiver (Tx/Rx) 312, which may be transmitters, receivers, or combinations thereof. A Tx/Rx 312 may be coupled to plurality of downstream ports 310 for transmitting and/or receiving frames from other nodes, a Tx/Rx 312 coupled to plurality of upstream ports 330 for transmitting and/or receiving frames from other nodes. A processor 325 may be coupled to the Tx/Rxs 312 to process the frames and/or determine the nodes to which to send frames. The processor 325 may comprise one or more multi-core processors and/or memory modules 322, which may function as data stores, buffers, etc. Processor 325 may be implemented as a general processor or may be part of one or more application specific integrated circuits (ASICs) and/or digital signal processors (DSPs). The downstream ports 310 and/or upstream ports 330 may contain electrical and/or optical transmitting and/or receiving components. Network element 300 may or may not be a routing component that makes routing decisions. The memory modules 322 may be used to house the instructions for carrying out the system and methods described herein, e.g., for storing keys, knowledge of procedures and/or protocols, etc. The memory module 322 may comprise a programmable content block 328 comprising instructions that may be executed by the processor 325. The programmable content block 328 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table 329 comprised within the memory module 322. The programmable content block 328 may interpret user requests for content and accordingly fetch content, e.g., based on metadata and/or content name, from the network or other content routers and may store the content, e.g., temporarily, in the memory module 322. The programmable content block 328 may then forward the cached content to the user. The programmable content block 328 may be implemented using software, hardware, or both and may operate above the IP layer, e.g., linking layer 2 (L2) or L3, in the OSI model. The memory module 322 may comprise a cache for temporarily storing content, e.g., a Random Access Memory (RAM). Additionally, the memory module 322 may comprise a long-term storage for storing content relatively longer, e.g., a Read Only Memory (ROM). For instance, the cache and the long-term storage may include dynamic random-access memories (DRAMs), solid-state drives (SSDs), hard disks, or combinations thereof.

It is understood that by programming and/or loading executable instructions onto the network element 300, at least one of the processor 325, the cache, and the long-term storage are changed, transforming the network element 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
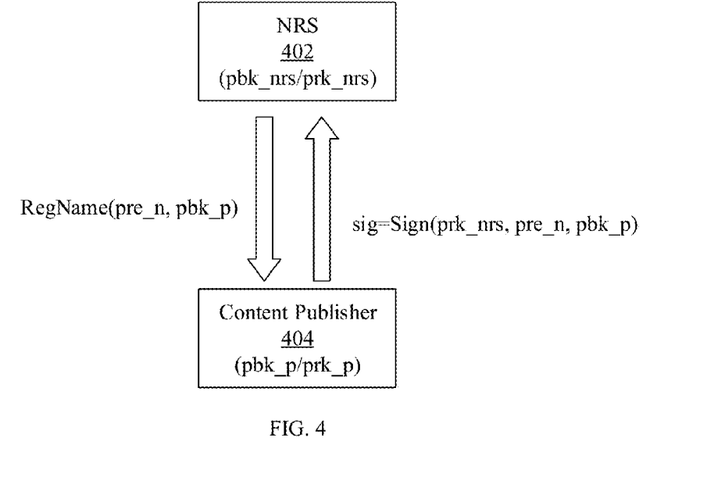
FIG. 4 shows a bootstrap name registration procedure for a content publisher.

FIG. 4 shows a bootstrap name registration procedure for a content publisher 404 in communication with a NRS 402. Content publisher 404 may be any device, e.g., content publisher 202 of FIG. 2, capable of publishing content to a network, e.g., ICN network infrastructure 102. NRS 402 may be a device, e.g., one of the routers 104, 106, and 108 of FIG. 1, or a service that is capable of functioning as a local or global authority for a network. The knowledge of procedures and/or protocols for implementing the bootstrap name registration procedure (more specifically, the keys themselves) for either the content publisher 404 or the NRS 402 might be stored, e.g., in the memory module 322 of FIG. 3.

Content publisher 404 may comprise a public/private key pair, e.g., pbk_p/prk_p. The trust of pbk_p may be built on top of another trust management mechanism, e.g., Resource Public Key Infrastructure (RPKI)/Simple Public Key Infrastructure (SPKI)/RPKI, administrative or social trust management mechanism, FIG. 4 shows content publisher 404 registering a name prefix pr_n with the NRS. As shown, the content publisher 404 registration request may include the public key certificate, pbk_p. The NRS 402 may bind the prefix name and the content publisher name, e.g., (name, pbk_p), and may announce the prefix name and publisher name to other nodes in the network. Once the NRS 402 has successfully verified the certificate, which may include obtaining additional information from content publisher 404, the NRS 402 may return a signature, e.g., (pre_n and pbk_p), which may be signed by the private key of NRS 402, e.g., prk_nrs.

Figure 5:
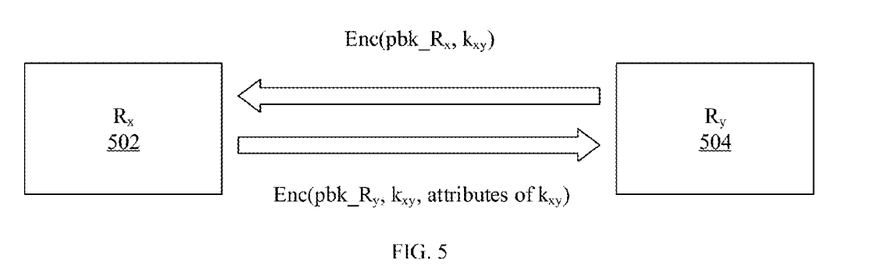
FIG. 5 shows a link-based secure session key (SSK) establishment procedure between a first router and a second router.

FIG. 5 shows a link-based SSK establishment between a first router ($R_x$) 502, e.g., router 104 of FIG. 1, and a second router ($R_y$) 504, e.g., router 106 of FIG. 1, which may establish a known and/or trusted path for data transmissions within the network, e.g., ICN network infrastructure 102. $R_x$ 502 and $R_y$ 504 may be direct neighbors sharing a physical link. $R_x$ 502 may generate a shared secret key, $k_{xy}$, including a shared secret package. $R_x$ 502 may encrypt $k_{xy}$ with a public key of $R_y$ 504, pbk_$R_y$. Some attributes may be included in the shared secret package, e.g., an expiration date, router name and/or identification, a random nonce (to prevent replay attacks), etc. Upon receipt, $R_y$ 504 may decrypt the $k_{xy}$ to obtain the shared secret package. Many options to establish a shared secret can be used and the disclosed embodiments do not require using any particular one. In one embodiment, Diffie-Hellman protocol was used to establish the shared secret.

FIG. 6 shows a protocol diagram for a name prefix announcement between a content publisher 202 and routers 104, 106, and 108. FIG. 6 assumes that each pair of routers with a physical link has a shared secret, e.g., the shared secret of FIG. 5. At 602, content publisher 202 sends router 104 an announcement, e.g., PrePub (pre_n, pbk_p, sig(pre, pbk_p, prk_nrs)), where pre_n is a prefix that the content publisher 202 is authorized to own/publish, pbk_p is the public key of the content publisher 202, and where sig is the signature from the NRS, e.g., NRS 402 of FIG. 4. At 604, router 104 may verify the signature with pbk_nrs. If verification fails, router 104 may drop the announcement. If verification passes, router 104 may update its internal FIB to reflect verification, e.g., with (pre_n, pbk_p, f1). In some embodiments, a keyed-hash message authentication code (HMAC), Hash(pbk_p), may be generated and/or used to save space. At 606, router 104 sends router 106 an announcement, e.g., PreAnnounce (pre_n, sig, pbk_p, R1), where R1 is the identity of router 104, along with an HMAC, e.g., HMAC(PreAnnounce‖K12), where K12 is the shared secret between routers 104 and 106. At 608, router 106 may generate an HMAC' (PreAnnounce‖K12) to verify against the received HMAC(PreAnnounce‖K12) and verifies the sig with pbk_nrs. If verification fails, the announcement may be dropped. If verification passes, router 106 may update its internal FIB to reflect verification, e.g., with (pre_n, pbk_p, f1), where f1 is the port or face by which router 106 communicates with router 104. At 610, router 106 may send a preannouncement to router 108, e.g., PreAnnounce (pre_n, sig, pbk_p, R2), where R2 is the identity of router 106, along with a HMAC, e.g., HMAC(PreAnnounce‖K23), where K23 is the shared secret between routers 106 and 108. At 612, router 108 may generate an HMAC'(PreAnnounce‖K23) to verify against the received HMAC(PreAnnounce‖K23) and may verify the sig with pbk_nrs. If verification fails, the announcement may be dropped. If verification passes, router 106 may update its internal FIB to reflect verification, e.g., with (pre_n, pbk_p, f1), where f1 is the port or face by which router 108 communicates with router 106. Notably, some embodiments of announcements may include other fields, e.g., a random nonce for preventing message replay attacks, as will be understood by those of skill in the art.

FIG. 7 shows a protocol diagram for a name prefix revocation between a content publisher 202 and routers 104, 106, and 108. The components of FIG. 7 may be substantially the same as the components of FIG. 6. When a content publisher 202 wants to revoke a prefix such that it will not respond to content requests for that prefix, the content publisher 202 may begin the revocation process at 702 by sending a revocation, e.g., PreRvk (pre_n, pbk_p, sig(pre, pbk_p, prk_nrs)), to router 104. Upon receiving the revocation, at 704 router 104 may verify the signature with pbk_nrs. If verification fails, router 104 may drop the revocation. If verification passes, router 104 may check whether the prefix, e.g., (pre_n, pre_p, f1) in its FIB. If so, router 104 may remove the prefix from its routing table. At 706, router 104 may send a revocation, e.g., PreRvk(pre_n, pbk_p, R1), along with a hash, e.g., HMAC (PreRvk‖K12), to router 106. Upon receipt, at 708 router 106 may generate an HMAC'(PreRvk‖K12) to verify against the received HMAC(PreRvk‖K12) and may verify the signature with pbk_nrs. If verification fails, router 106 may drop the revocation. If verification passes, router 106 may check whether the prefix, e.g., (pre_n, pre_p, f1) in its FIB. If so, router 106 may remove the prefix from its routing table. At 710, router 106 may send a revocation, e.g., PreRvk(pre_n, pbk_p, R2), along with a hash, e.g., HMAC(PreRvk‖K23), to router 108. Upon receiving the revocation, at 712 router 108 may generate an HMAC'(PreRvk‖K23) to verify against the received HMAC(PreRvk‖K23) and may verify the signature with pbk_nrs. If verification fails, router 108 may drop the revocation. If verification passes, router 108 may check whether the prefix, e.g., (pre_n, pre_p, f1) in its FIB. If so, router 108 may remove the prefix from its routing table. Notably, some embodiments of announcements may include other fields, e.g., a random nonce for preventing message replay attacks, as will be understood by those of skill in the art.

Figure 8:
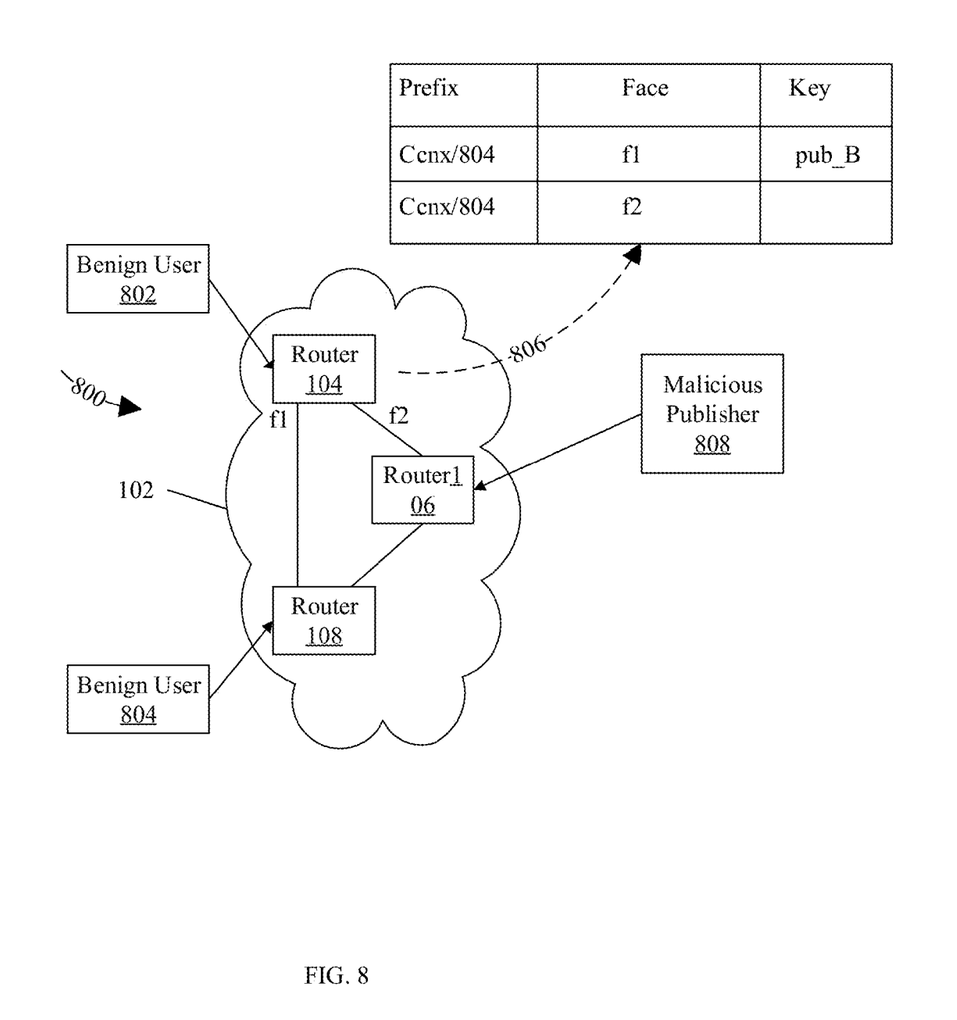
FIG. 8 shows a trust-augmented routing system in an ICN network infrastructure.

FIG. 8 shows a trust-augmented routing system 800 in an ICN network infrastructure 102. Benign users 802 and 804 may be any user devices, e.g., benign user 120 of FIG. 1. Malicious publisher 808 may be any user devices, e.g., malicious content publisher 202 of FIG. 2. The router 104 may be configured to prefer forwarding interests from ports or faces having a verified prefix announcement. Router 104 may comprise an internal routing table 806 having two entries for a prefix indicating a benign user 804, e.g., 'Ccnx/804'. The first entry in internal routing table 806 may comprise a receiving port or face, e.g., f1, and a public key, e.g., pub_B, indicating that the prefix received over port or face f1 has been received from a trusted connection in accordance with a prefix announcement as described under FIG. 6. The second entry in internal routing table 806 may comprise a second receiving port or face list, e.g., f2, with no associated public key. As will be understood, alternate attacks may include unverified public keys. In the event of a name/prefix hijack attack originating from malicious publisher 808, e.g., hijacking prefix Ccnx/804, router 104 may select the entry associated with the trusted connection over port or face f1.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a memory;
    a processor coupled to the memory, wherein the memory contains instructions that when executed by the processor cause the apparatus to:
    receive an information centric network (ICN) name prefix announcement message comprising:
        a message prefix specific to a content publisher node coupled to or comprised within the ICN;
        a public key encryption certificate specific to the content publisher; and
        a digital signature specific to the content publisher;
    verify the signature with a name registration service (NRS); and
    update internal data indicating that the content publisher is a trusted publisher, wherein the internal data comprises the prefix, the public key, and the signature.

2. The apparatus of claim 1, wherein the internal data comprises a forwarding table for identifying the interface over which a packet should be forwarded.

3. The apparatus of claim 1, wherein verifying the signature with a name registration service comprises verifying that the name registration service received the signature and additional identity verifying information from the content publisher.

4. The apparatus of claim 1, wherein the instructions further cause the apparatus to generate a keyed-hash message authentication code (HMAC) for exchanging data with a router.

5. The apparatus of claim 4, wherein the prefix announcement message further comprises a second HMAC, wherein the instructions further cause the apparatus to verify the first HMAC against the second HMAC, wherein the prefix announcement message is accepted when the verification passes, and wherein the prefix announcement message is dropped when the verification fails.

6. The apparatus of claim 1, wherein the instructions further cause the apparatus to establish a secure session key (SSK) with a router.

7. The apparatus of claim 1, wherein the instructions further cause the apparatus to:
    receive an ICN name prefix revocation message comprising:
        the message prefix specific to the content publisher;
        the public key encryption certificate specific to the content publisher; and
        the signature specific to the content publisher;
    verify the signature with the NRS; and
    update internal data to revoke the prefix.

8. A computer program product comprising computer executable instructions stored on a non-transitory medium that when executed by a processor cause the processor to:
    receive, via a first face, an information centric network (ICN) name prefix announcement message comprising a prefix and a digital signature;
    query a data table for a table entry corresponding to the first face, the prefix, and the signature;
    forward the prefix announcement via a second face when the table entry exists in the table; and
    when the table entry does not exist in the table:
        send a signature verification request to a name registration service (NRS), wherein the request comprises the signature;
        drop the prefix announcement message when a verification failure indication is received from the NRS in response to the request; and
        when a verification confirmation indication is received from the NRS in response to the request:
            create the table entry corresponding to the first face, the prefix, and the signature; and
            forward the prefix announcement message via the second face.

9. The computer program product, stored on the non-transitory medium, of claim 8, wherein when the table entry does not exist in the table the instructions further cause the processor to:
    query the table for a second table entry corresponding to a third face, the prefix, and the signature; and
    when the second table entry exists, forward the prefix announcement message via the third face.

10. The computer program product, stored on the non-transitory medium, of claim 8, wherein the name prefix announcement message further comprises a public key certificate.

11. The computer program product, stored on the non-transitory medium, of claim 10, wherein the instructions further cause the processor to:
    generate a hash value for the public key certificate; and
    replace the public key certificate with the hash value prior to forwarding the data request via the second face.

12. The computer program product, stored on the non-transitory medium, of claim 8, wherein the data request further comprises a keyed-hash message authentication code (HMAC).

13. The computer program product, stored on the non-transitory medium, of claim 12, wherein the instructions further cause the processor to:
    generate a second HMAC; compare the first HMAC with the second HMAC; and
    drop the name prefix announcement message when the comparison indicates that the data request is not authentic.

14. A method of executing a name prefix based routing protocol, comprising:
    receiving a first information centric network (ICN) name prefix announcement message comprising a prefix, a signature, and a public key certificate;
    querying a routing table for an entry corresponding to the first prefix announcement message, wherein the routing table comprises prefix, signature, and public key encryption certificate fields for each entry fields;

forwarding the first prefix announcement message upon receiving confirmation that the entry exists in the routing table; and upon receiving confirmation that the entry does not exist in the routing table:
- sending a signature verification request to a name registration service (NRS);
- dropping the first prefix announcement message upon receipt of a verification failure indication from the NRS; and
- upon receiving verification confirmation from the NRS:
  - creating the routing table entry corresponding to the prefix, the signature, and the public key; and
  - sending a second prefix announcement message via a second face.

15. The method of claim 14, wherein the first prefix announcement message is received via a first face, wherein the routing table comprises a second entry for the prefix, the signature, and the public key certificate corresponding to a third face, wherein the routing table does not comprise an entry for the prefix, the signature, and the public key certificate corresponding to the first face, and further comprising forwarding a third prefix announcement message along the third face.

16. The method of claim 14, wherein the second face utilizes a link-based secure session key (SSK).

17. The method of claim 16, wherein the confirmation from the NRS indicates that the NRS created the signature in response to a publisher request for authorization coupled with additional publisher-supplied authorizing information.

18. The method of claim 14, further comprising:
- receiving an ICN prefix revocation message comprising the prefix, the signature, and the public key certificate;
- verifying the signature with the NRS; and
- updating the routing table to revoke the prefix.

19. The method of claim 14, further comprising generating a keyed-hash message authentication code (HMAC) for exchanging data with a router.

20. The method of claim 19, wherein the data request further comprises a second HMAC, the method further comprising:
- verifying the first HMAC against the second HMAC;
- forwarding the data request when the verification passes; and
- dropping the data request when the verification fails.

* * * * *